US006877228B2

(12) United States Patent
Beetz et al.

(10) Patent No.: US 6,877,228 B2
(45) Date of Patent: Apr. 12, 2005

(54) PLIERS AND METHOD FOR CUTTING AMORPHOUS LIGHT WAVE GUIDE CABLES

(75) Inventors: Horst Beetz, Stadtallendorf (DE); Kurt Battenfeld, Ebsdorfergrund-Wittelsberg (DE)

(73) Assignee: Wezag GmbH Werkzeugfabrik, Stadtallendorf (DE)

( * ) Notice: Subject to any disclaimer, the term of this patent is extended or adjusted under 35 U.S.C. 154(b) by 184 days.

(21) Appl. No.: 10/188,479

(22) Filed: Jul. 3, 2002

(65) Prior Publication Data

US 2003/0005586 A1 Jan. 9, 2003

(30) Foreign Application Priority Data

Jul. 4, 2001 (DE) ......................................... 101 32 413

(51) Int. Cl.[7] ............................................. B21F 13/00
(52) U.S. Cl. ......................................... 30/134; 30/135
(58) Field of Search ..................... 30/91.2, 138, 334, 30/330, 90.1, 92, 134, 135; 81/9.49, 9.42, 9.41, 9.44

(56) References Cited

U.S. PATENT DOCUMENTS

| | | | | |
|---|---|---|---|---|
| 2,407,233 A | * | 9/1946 | Greer et al. ................. | 30/91.2 |
| 2,903,064 A | * | 9/1959 | Blonder ....................... | 30/90.6 |
| 3,139,777 A | * | 7/1964 | Gindoff ....................... | 81/9.44 |
| 3,221,576 A | * | 12/1965 | Goetz .......................... | 81/9.43 |
| 3,344,691 A | | 10/1967 | Staggs .......................... | 81/9.5 |
| 4,571,764 A | * | 2/1986 | Chen et al. ..................... | 7/107 |
| 4,912,847 A | * | 4/1990 | Bradshaw ................... | 30/91.2 |
| 4,958,433 A | * | 9/1990 | Persson ....................... | 30/91.2 |
| 4,979,299 A | * | 12/1990 | Bieganski .................... | 30/90.1 |
| 5,003,846 A | | 4/1991 | Yagawa ....................... | 81/9.42 |
| 5,398,413 A | * | 3/1995 | Chen .......................... | 30/90.1 |

FOREIGN PATENT DOCUMENTS

| | | | | |
|---|---|---|---|---|
| DE | 19842122 A1 | 9/1998 | | |
| EP | 0184897 A1 | 10/1985 | ........... | C03B/37/16 |
| EP | 0829331 A2 | 3/1998 | ........... | B26D/3/16 |
| EP | 1061387 A2 | 12/2000 | ........... | G02B/6/25 |
| FR | 2561233 A1 | 9/1985 | ........... | C03B/37/16 |

* cited by examiner

*Primary Examiner*—Kenneth E. Peterson
*Assistant Examiner*—Omar Flores Sánchez
(74) *Attorney, Agent, or Firm*—Thomas, Kayden, Horstemeyer & Risley, LLP

(57) ABSTRACT

The present invention relates to a method and pliers for cutting amorphous light wave guide cables including a core and at least one insulating sheath. The pliers include a pliers head, a first clamping jaw and a second clamping jaw being arranged in the pliers head. The first and second clamping jaw are designed and arranged to form a clamping profile to receive a light wave guide cable. A cutting element is arranged in the pliers head to be stationary. A drive is operatively connected to the first and second clamping jaw to move the first and second clamping jaw in one direction with respect to the cutting element during a stroke of movement, the stroke of movement including a clamping stroke, a cutting stroke and an opening stroke. The present invention also relates to a method of cutting optical fiber cables. The method includes the steps of clamping the, optical fiber cable between clamping elements and moving the clamped optical fiber cable with respect to a stationary cutting element to cut the optical fiber cable.

9 Claims, 7 Drawing Sheets

PLIERS AND METHOD FOR CUTTING AMORPHOUS LIGHT WAVE GUIDE CABLES

CROSS REFERENCE TO RELATED APPLICATIONS

This application claims priority to co-pending German Patent Application No. 101 32 413.8-51 entitled "Verfahren und Zange zum Schneiden amorpher Lichtwellenleiterkabel", filed Jul. 4, 2001.

FIELD OF THE INVENTION

The present invention generally relates to pliers and a method for cutting plastic cables. Such cables are made of a polymer, and they may also be called POF cables. The cables include a core being made of a multifilament—meaning a fiber bundle—or of a monofilament—meaning one single plastic fiber. The light wave guide cable or the optical fiber cable may be designed to include one core and only one sheath—meaning one insulating layer. However, it is possible that the light wave guide cable includes a core, an inner sheath and an outer insulating sheath. This design may also be called a three layer design. Such optical cables have to be cut without breakage marks or ridges occurring, and in a direction exactly perpendicular with respect to the longitudinal axis of the core to prevent undesired light losses, errors and interferences when connecting cut cable sections.

BACKGROUND OF THE INVENTION

A method and pliers for cutting light wave guide cables are known from German Patent Application No. 198 42 122 A1. The light wave guide cable to be cut includes a core being designed in the form of a bundle of optical fibers. The light wave guide cable also includes an inner sheath surrounding the optical fiber bundle, the inner sheath being surrounded by an outer insulating sheath. The light wave guide cable is inserted into a clamping profile of a pair of clamping jaws, and it is clamped at the outer insulating sheath. In a first step, a channel is produced in the outer insulating sheath for later removal of the free end of the outer insulating sheath. Then, the light wave guide cable including the inner sheath and still the outer insulating sheath is cut. In the following, the outer insulating sheath is removed against the holding force of the knife for producing the channel. Afterwards, the cable is connected to a cable plug by crimping.

The known pliers include a pair of clamping jaws forming a clamping profile coordinated with the kind and the size of the light wave guide cable. The movable clamping jaw of the pair of clamping jaws is driven by a pliers drive including handles and a toggle lever drive such that the light wave guide cable with the outer insulating sheath is fixedly held in the closed position of the clamping jaws. A round blade being ground with great precision is located in the region of the pliers head, the blade being supported on a pivot arm to be freely rotatable, and to be moved to reach the cutting position by actuating a handle. The round blade is moved to pass the cable being supported by the clamping jaws. It is desired to smoothly cut the bunch of optical fibers to attain a smooth contact surface. The light wave guide cable is supported between the clamping jaws. In this position, the round knife is moved to pass the clamping jaws until the cable has been cut. In these known pliers, the light wave guide cable remains stationary during the cutting action, while the elements serving to produce a channel in the outer insulating sheath and to move the round knife with respect to the stationary cable are moved. An arrangement of a plurality of effective stations in association with the pair of clamping jaws requires a certain structural size and a certain axial distance of the effective locations with respect to the pair of clamping jaws. Consequently, there is the danger of the light wave guide cable not being cut at a right angle, and of the inner sheath being damaged during notching of the outer insulating sheath.

SUMMARY OF THE INVENTION

The present invention relates to pliers for cutting amorphous light wave guide cables including a core and at least one insulating sheath. The pliers include a pliers head, a first clamping jaw and a second clamping jaw being arranged in the pliers head. The first and second clamping jaw are designed and arranged to form a clamping profile to receive a light wave guide cable. A cutting element is arranged in the pliers head to be stationary. A drive is operatively connected to the first and second clamping jaw to move the first and second clamping jaw in one direction with respect to the cutting element during a stroke of movement, the stroke of movement including a clamping stroke, a cutting stroke and an opening stroke.

The present invention also relates to pliers for cutting optical fiber cables. The pliers include a pliers head, a cutting element being arranged in the pliers head and at least one first clamping jaw and at least one second clamping jaw being arranged in the pliers head. The first and second clamping jaw are designed and arranged to receive an optical fiber cable, to clamp the optical fiber cable and to move the optical fiber cable with respect to the cutting element to cut the optical fiber cable.

The present invention also relates to a method of cutting amorphous light wave guide cables including a core and at least one insulating sheath. The method includes the steps of supporting the light wave guide cable in a clamping profile being formed by at least two clamping elements, clamping the light wave guide cable in the clamping profile during a clamping stroke, cutting the light wave guide cable with a cutting element by moving the light wave guide cable with respect to a stationary cutting element during a cutting stroke, and releasing the light wave guide cable from the clamping profile during an opening stroke. The clamping stroke, the cutting stroke and the opening stroke are part stroke of movement of the at least two clamping elements in one direction with respect to the stationary cutting element.

The present invention also relates to a method of cutting optical fiber cables. The method includes the steps of clamping the optical fiber cable between clamping elements and moving the clamped optical fiber cable with respect to a stationary cutting element to cut the optical fiber cable.

With the novel method and the novel pliers for cutting a light wave guide cable including a core, an inner sheath and an outer insulating sheath, the outer insulating sheath is removed by a first separate method step. Removing the outer insulating sheath is attained by first notching the sheath, and by then pulling off the respective section of the outer insulating sheath. In the following, the light wave guide cable is not supported at the outer insulating sheath, but instead at the inner sheath by the pair of clamping jaws. The clamping profile being formed by the pair of clamping jaws may be chosen to be smaller than it is known in the prior art. Consequently, the light wave guide cable may be held and supported at the inner sheath—meaning at a smaller distance with respect to the longitudinal axis of the fiber bundle. This means that it may be clamped with greater exactness. However, this step of removing the outer sheath is of course not required when cutting a light wave guide cable only including a core and one insulating sheath.

The clamping jaws do not only serve to clamp and to support, respectively, the light wave guide cable at the inner sheath and at the only insulating sheath, respectively, but also to realize a stroke of movement of the clamping jaws together with the light wave guide cable with respect to the stationary cutting element such as a blade, a knife and the like. Consequently, the light wave guide cable is moved while the blade is not moved. The light wave guide cable or the optical fiber cable is moved with respect to the cutting element in one direction within a stroke of movement. Such a stroke of movement being directed in one direction is to be understood as a movement of the light wave guide cable without changing the direction of movement. Especially, the movement may be straight. During the stroke being directed in one direction, the cable is first clamped during a clamping stroke, and it is then fixedly supported. After the clamping stroke, there is the actual cuffing stroke during which the cable is completely cut by the blade. The last portion of the stroke of movement is an opening stroke during which the section of the light wave guide cable forming the work piece is released. Thus, there is no danger of the cutting surface being damaged or otherwise negatively influenced during a double stroke including a forward stroke portion and a backward stroke portion as it is known in the prior art.

Furthermore, the novel method results in advantageous smoothening effects and compression effects occurring at the cut surface due to the thickness of the knife. Preferably, the stroke of movement may be defined by a locking unit. The stroke of movement corresponding to the closing stroke of the pliers includes a clamping stroke followed by a cutting stroke followed by an opening stroke. This means that the work piece has already been released from the pliers when the opening stroke has been completed without the backward stroke of the elements of the pliers taking place. Usually, the clamping stroke, the cutting stroke and the opening stroke will directly follow one after the other to commonly form the stroke of movement being directed in a forward direction. However, it is also possible to chose a design in which there are overlaps or safety strokes between the clamping stroke, the cutting stroke and/or the opening stroke.

It is especially advantageous if the inner sheath and the insulating element of the light wave guide cable, respectively, is clamped and guided by first and second clamping jaws being located at both sides of the knife—meaning a first pair of clamping jaws being located at one side and a second pair of clamping jaws being located at the other side—during the stroke of movement. The cable is no longer clamped and held at only one side, and it is not processed in different units at a more or less great distance with respect to the clamping location. Instead inserting, clamping and guiding the light wave guide cable takes place just right and left of the cutting location. Such an arrangement allows for a straight, exact and perpendicular arrangement of the light wave guide cable with respect to the blade such that the perpendicular cut may be conducted at great precision and with improved surface properties at the cutting location.

The cutting element at both sides may include cutting edge portions. The cutting edge portions may be designed and arranged to be symmetrical or to be non-symmetrical. The cutting element may have a thickness of approximately 0.25 mm, for example. The two cutting edge portions being located at both sides in a symmetric way result in compression effects and smoothening effects of the cut surface of the cable during the cutting process. The compression effects correspond to approximately half the thickness of the knife. Such effects are positive, and they may be increased by choosing a respective non-symmetric arrangement of two cutting edge portions. It is also possible to reduce these effects.

The cutting element may be designed and arranged to be easily removable from the pliers head. It may make sense to conduct only one cutting operation with a knife, or at least only a few cutting operations, and to then replace the knife to attain great surface quality at the cutting surface in a reproducible way.

A pair of clamping jaws each including a first clamping jaw and a second clamping jaw may be located at both sides of the knife. However, the clamping jaws may also be designed to be continuous. Such an arrangement allows for simultaneous support at both sides right and left of the cutting location and close to the knife, respectively. It is to be understood that there only is a total number of two clamping jaws including one continuous first clamping jaw and one continuous second clamping jaw when using a continuous pair of clamping jaws. The clamping jaws have a respective extension in a direction transverse with respect to the plane of main extension of the knife. However, it is also possible to use pairs of clamping jaws which are not continuous. Consequently, there is a total number of four clamping jaws—meaning two first clamping jaws and two second clamping jaws. In all these above described cases, the light wave guide cable is closely supported right and left of the cutting location. Such an arrangement improves exactness of the cutting movement and of the quality of the cut surface. However, it is possible to use only one pair of clamping jaws—meaning one first clamping jaw and one second clamping jaw.

In the case of a pair of two continuous clamping jaws being located at both sides of the cutting element, there may be a guiding channel being coordinated with the thickness of the knife. The guiding channel is only slightly wider than the thickness of the knife such that the knife is guided in the guiding channel during the cutting stroke at both sides. In this way, negative influences such as undesired marks, impressions and the like of the cut surface may be prevented. It is also ensured that the knife does not move in a lateral direction in an undesired way.

In a preferred exemplary embodiment of the novel pliers, one of the clamping jaws of the pair of clamping jaws may be guided at cover plates being located in the pliers head in a straight way during the stroke of movement and in a direction perpendicular with respect to the cuffing element. The second clamping jaw may be pivotally supported on the first clamping jaw. A cam drive may be located between the second clamping jaw and the cover plates of the pliers head. The cam drive serves to apply a variable clamping stroke over the stroke of movement. However, it is also possible that both clamping jaws are pivotally connected to the pliers head, and that a variable clamping stroke is applied due to the movement of the two clamping jaws with respect to one another. A cam drive allows for reliable application of different paths and/or forces onto the clamping jaws of a pair of clamping jaws. Then, it is possible to realize variable clamping pressure during the cutting stroke. Such a clamping pressure may especially be chosen to diminish or to increase over the cutting stroke. It is also possible that the second pivotally supported clamping jaw includes a cam surface extending over the stroke of movement, and that an associated pressure roller is located in the pliers head. The pressure roller may be supported in the region of the pliers head to be stationary and freely rotatable. It is also possible that the pressure roller is supported on a bolt being designed and arranged to be eccentrically adjustable to adjust the clamping stroke in this way. It is preferred to design the extension of the clamping jaw in a direction transverse to the direction of main extension of the knife not to be too short to be capable of clamping and supporting the inner sheath of the light wave guide cable at a respectively long distance such that the cable at least during the cutting stroke has the desired extended position. The thickness of the portion of the camping jaws protruding to the right and to the left of the knife may form a stop. The removed end of the outer sheath contacts the stop such that the length of the inner sheath (of which the outer sheath has been removed) is determined by conducting the cutting operation. This length may be coordinated with the length of a crimping mounting, for example.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
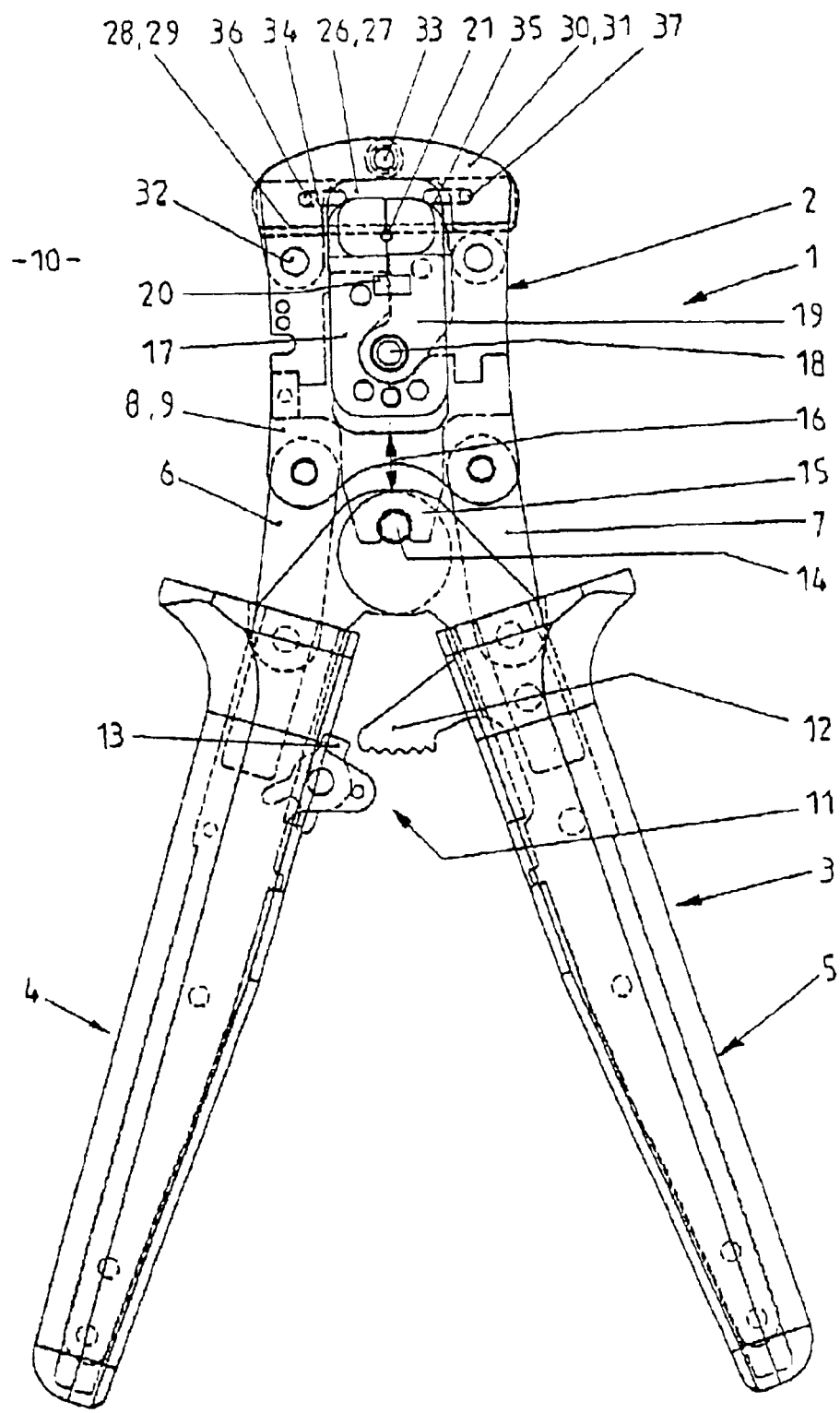
FIG. 1 is a top view of a first exemplary embodiment of the novel pliers.

Referring now in greater detail to the drawings, FIG. 1 illustrates novel pliers 1 including a pliers head 2 and a pliers drive 3. The drive 3 according to FIG. 1 is designed to include two levers 4 and 5 to be operable by hand. However, the pliers drive 3 may also have different designs, for example it may be a hydraulic unit or a pneumatic unit.

In the case of a manual pliers drive 3 including the two levers 4 and 5, some of the elements of the novel pliers 1 have a known structure, for example, the lever 4 is pivotally connected to two cover plates 8 and 9 by a pulling element 6, and the lever 5 is pivotally connected to the two cover plates 8 and 9 by a pulling element 7. The arrangement is chosen to be symmetrical. Each of the pulling elements 6 and 7 at their two ends includes a pivotal connection element. The two cover plates 8 and 9 (FIG. 6) have frame-like designs, they include an opening in the center portion, and they are located to be spaced apart from a center plane 10 approximately at the same distance. The center plane 10 and the plane of main extension of the pliers 1 coincide. The two cover plates 8 and 9 are fixedly interconnected at different locations (not illustrated in greater detail). A locking unit 11 is located between the two levers 4 and 5, the locking unit including a tooth segment 12 and a locking element 13 being located at the other lever or handle 4. The structure and the operation of such locking units 11 are well known in the art. Such a design ensures that the pliers 1 do not open before the complete closing movement of the handles 4 and 5 with respect to one another has been achieved.

The ends of the handles 4 and 5 facing the pliers head 2 are interconnected to be pivotal about a pressure bolt 14. The pressure bolt 14 engages a sliding piece 15 being guided at the cover plates 8 and 9 in a straight way such that the guiding piece 15 depending on the pivotal position of the handles 4 and 5 with respect to one another can only fulfill a straight movement in the direction towards double arrow 16. During the forward stroke—meaning during closing of the handles 4 and 5 with respect to one another—the sliding piece 15 moves straight inside the plates 8 and 9 in an upward direction towards the free end of the pliers head 2. During the opening movement of the handles 4 and 5, the opposite relative movement occurs between the cover plates 8 and 9.

Figure 9:
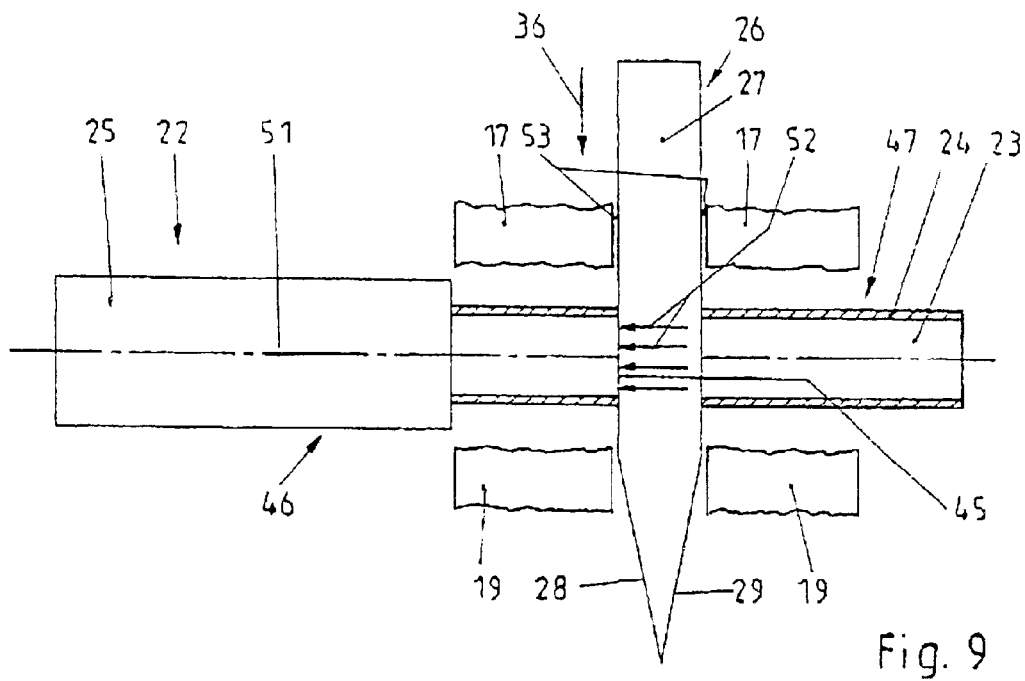
FIG. 9 is a view showing the relative position of the blade with respect to the light wave guide cable, the blade having symmetrical cutting edge portions.

A first clamping jaw 17 is connected to the sliding piece 15. The clamping jaw 17 is also guided at the cover plates 8 and 9 in a straight way in the direction of double arrow 16 such that it fulfills the same movement as the sliding piece 15. A second clamping jaw 19 is designed and arranged to be pivotal about a bearing 18 and on the clamping jaw 17. The second clamping jaw 19 may be pivoted about the pivotal bearing 18 within a comparatively small pivotal angle. A spring (not illustrated) being located in a spring housing 20 subjects the two clamping elements 17 and 19 in an opening sense. A clamping profile 21 having an approximately semi-symmetrical design is located between the two clamping jaws 17 and 19. In other words, the clamping profile 21 is formed by the clamping jaws 17 and 19. The light wave guide cable 22 (FIGS. 9 and 10) or the optical fiber cable to be cut is to be located and inserted, respectively, at this place. As it is especially to be seen from FIG. 9, the light wave guide cable 22 may have a design to include three layers, for example. In such an exemplary embodiment, the light wave guide cable 22 includes a core 23, an inner sheath 24 and an outer insulation sheath 25. However, different designs are also possible. The size and design of the clamping profile 21 being located between the clamping jaws 17 and 19 is coordinated with the diameter of the inner sheath or cover 24 of the cable 22 such that it is necessary to remove the insulation sheath 25 at this place before conducting the step of separation. This step of preparing the cable 22 by removing the insulation element may be conducted by different pliers or by suitable elements being arranged at the pliers 1 (not illustrated).

A cutting element 26 is arranged in the pliers head 2 in the region of the free end of the pliers head 2 facing away from the handles 4, 5. The cutting element 26 may be designed as a blade or a knife, and it is associated with the movement of the two clamping jaws 17 and 19 according to double arrow 16. The knife 26 includes a knife back 27, and preferably two cutting edge portions 28 and 29. The cutting edge portions 28 and 29 are produced at the blade 26 by grinding, and they together form the knife tip and the knife edge, respectively, which actually cuts.

Figure 6:
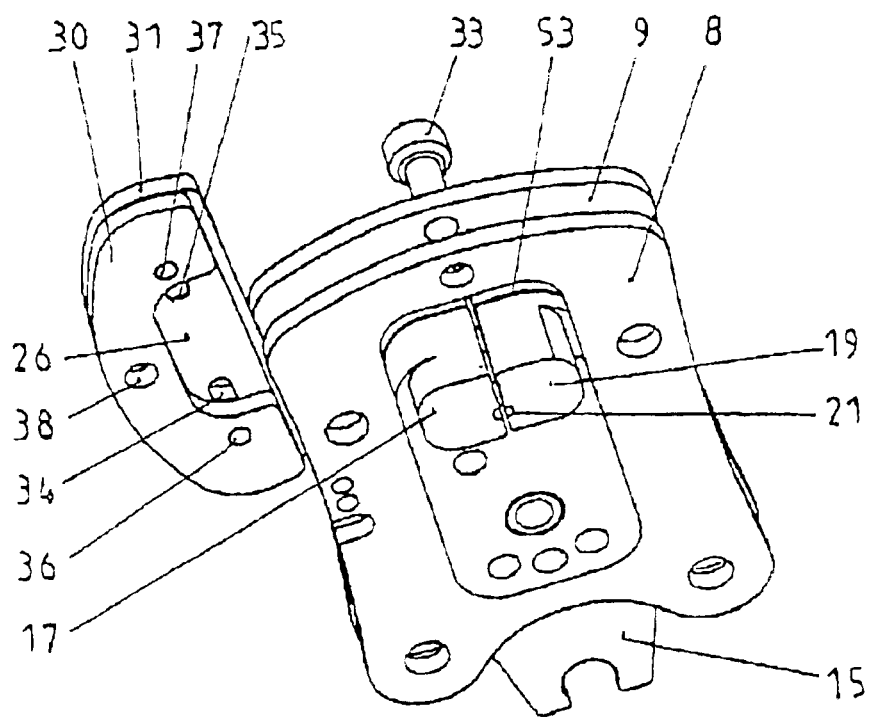
FIG. 6 is a perspective illustration of the pliers head of the novel pliers during a change of the blades.

The cutting element 26 is arranged in the pliers 2 head to be removable. This is to be seen from FIG. 6. The cutting element 26 is located between two supporting plates 30 and 31. Both supporting plates 30 and 31 are arranged at the cover plates 8 and 9 of the pliers head 2 to be commonly pivotal about a pivot bolt 32. FIG. 1 illustrated the inwardly pivoted position in which the supporting plates 30 and 31 are fixed by a fixing bolt 33 in a stationary way. Consequently, the cutting element 26 is located at the pliers head 2 in a stationary way. FIG. 6 illustrates the bolt 33 in its partly pulled-out position and the cutting element 26 being located between the supporting plates 30 and 31. The supporting plate 30 may be removed from the supporting plate 31 such that the cutting element 26 is accessible, and such that it may be removed. The cutting element 26 includes two elongated openings 34 and 35 with which it is located on cylindrical pins 36 and 37, the cylindrical pins 36 and 37 also serving to secure the relative position between the supporting plates 30 and 31. A bore 38 extends through the two supporting plates 30 and 31, and it serves to allow for penetration of the bolt 33 in the mounted, locked position.

Figure 5:
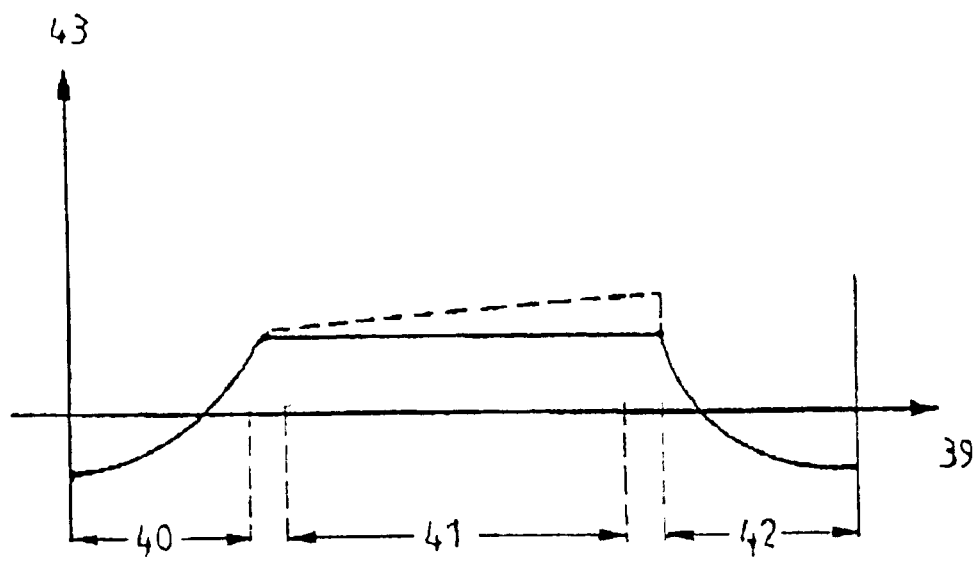
FIG. 5 is a diagram of the clamping stroke and of the stroke of movement.

Consequently, it is clear that the cutting element 26 during cutting operation is arranged to be stationary at the pliers head 2, and that the light wave guide cable 22 is moved with respect to the stationary cutting element 26. The clamping jaws 17 and 19 fulfill a stroke of movement 39 which is straight in only one direction of double arrow 16 and during which the clamping jaws 17 and 19 of the pair of clamping jaws move in one direction towards the blade 26. The stroke of movement 39 being directed in a straight direction includes different parts, as there is a clamping stroke 40, a cutting stroke 41 and an opening stroke 42. During the stroke of movement 39, the movable clamping jaw 19 fulfills a clamping stroke 43 with respect to the fixedly guided clamping jaw 17. The clamping stroke 43 is directed in the direction of a double arrow 44, meaning approximately perpendicular with respect to the double arrow 16. This is illustrated in FIG. 5 which shows the clamping stroke 43 on the vertical axis with respect to the stroke of movement 39 on the horizontal axis.

Figure 2:
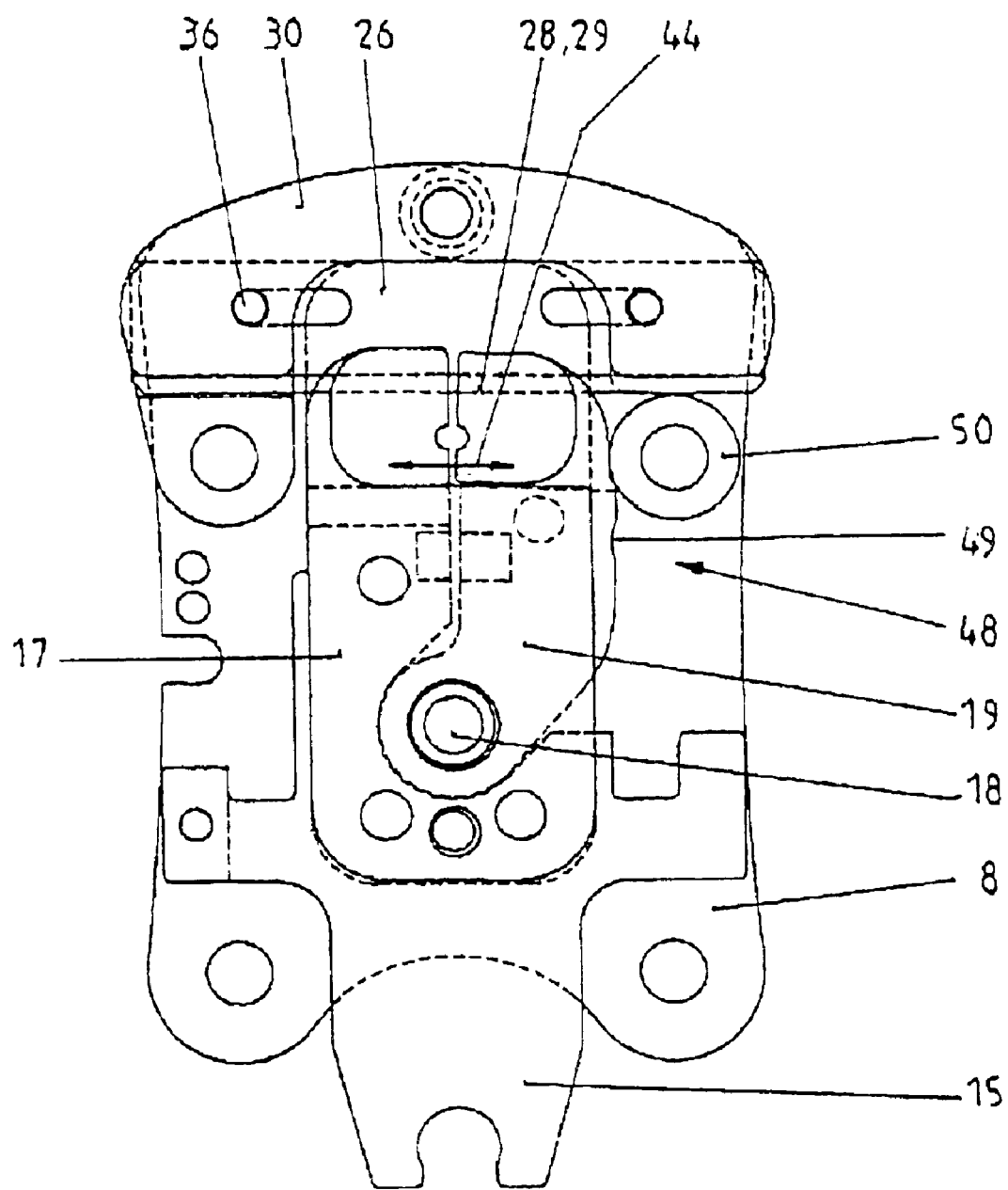
FIG. 2 is a top view of the pliers head of the novel pliers in an intermediate position during the clamping stroke.

FIG. 2 illustrates the relative position of the elements approximately at the beginning of the clamping stroke 40. The clamping jaws 17 and 19 are still located at a comparatively great distance with respect to each other. The clamping profile 21 is opened such that the light wave guide cable 22 with the partly removed outer insulation sheath 25—meaning with the inner sheath 24—may be inserted into the opened clamping profile 21. The extension of the clamping jaws 17 and 19 in the region about the clamping profile 21—meaning the thickness of the clamping jaws 17 and 19—is chosen such that the predetermined cutting plates and the resulting cutting surface 45 of the work piece 46 gets to be placed at the predetermined distance with respect to the end of the outer insulation sheath 25. The piece 47 to be removed by the cut may have any length.

Figure 3:
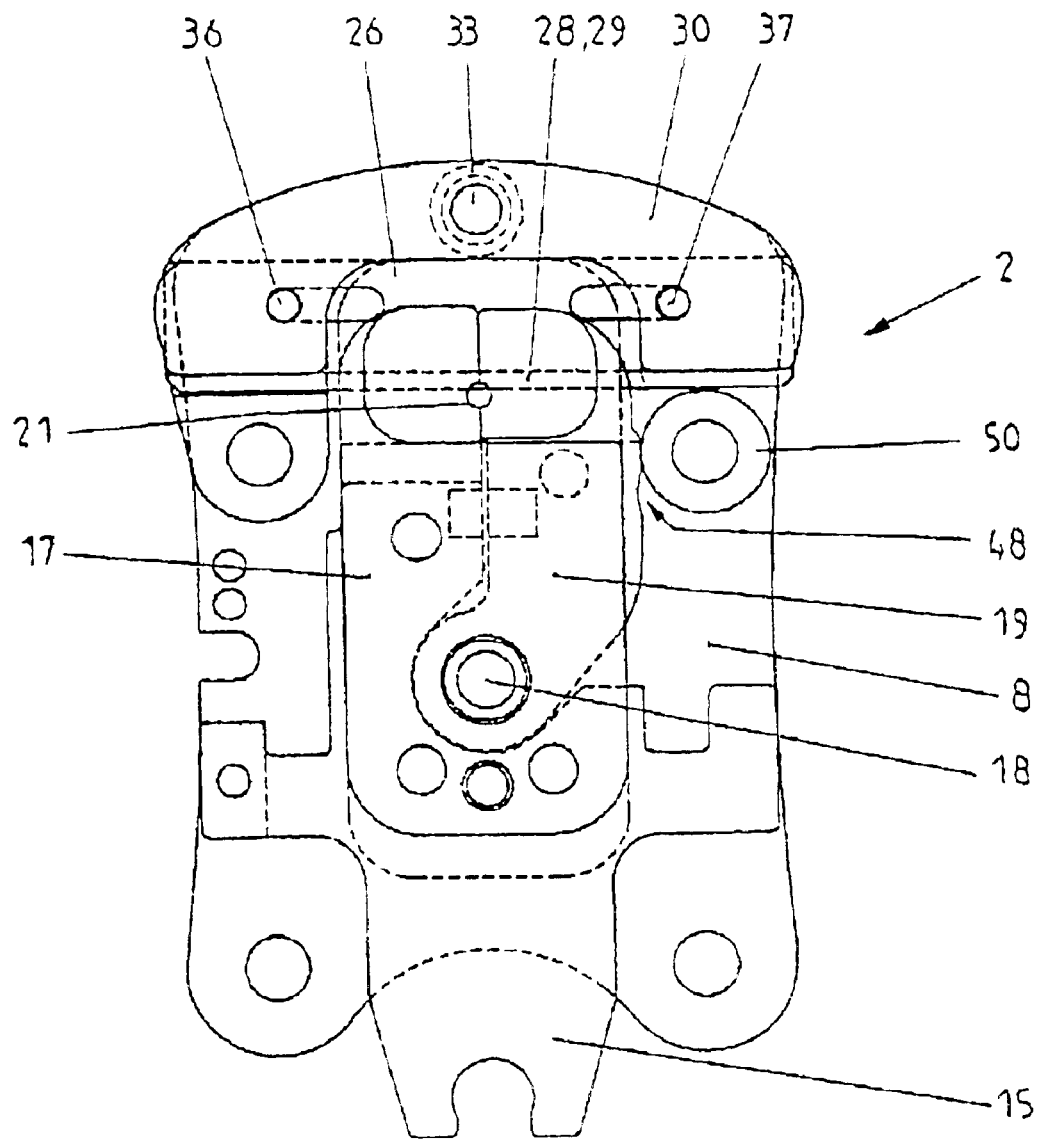
FIG. 3 is a top view of the pliers head of the novel pliers in an intermediate position during the cutting stroke.
Figure 10:
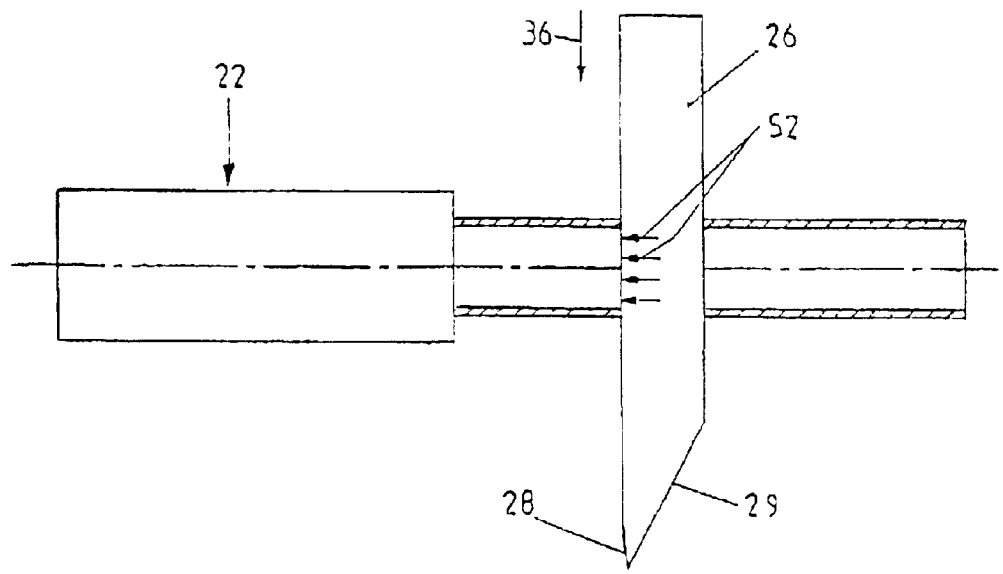
FIG. 10 is a similar view as FIG. 9, but showing a blade having non-symmetric cutting edge portions.

The novel cutting operation takes place as follows:

First of all, the end (of which the insulation sheath has been removed) of a light wave guide cable 22 (which has a three layer design, for example) is inserted into the opened clamping profile 21 between the clamping jaws 17 and 19 until it reaches the stop (FIG. 2). It may be seen from FIG. 2 that the clamping profile 21 is located at a respective distance with respect to the cutting edge portions 28 and 29 of the knife 26. A cam drive 48 is located between the pivotal clamping jaw 19 and the cover plates 8 and 9 of the pliers head. The cam drive 48 includes a cam surface 49 and an associated pressure roller 50. The pressure roller 50 is designed and arranged to be freely rotatable on the cover plates 8 and 9. The cam surface 49 has different protrusions extending in different directions over the stroke of movement such that the clamping stroke 43 may be determined by the stroke of movement 39. It is to be seen from FIGS. 2 and 5 that the clamping stroke 40 is realized just after having inserted the light wave guide cable 22 into the clamping profile 21. The clamping jaw 19 pivots in a counterclockwise direction, and the clamping profile 21 is totally or at least partly closed such that the inner sheath 24 of the light wave guide cable 22 is clamped at the end of the clamping stroke 40. At the end of the clamping stroke 40, the clamping profile 21 has been moved in an upward direction corresponding to the clamping stroke 40, but the inner sheath 24 has not yet contacted the knife 26. The cutting stroke does not begin before the movement of the stroke of movement 39 continues. FIG. 3 illustrates a relative position of the elements with respect to one another during the cutting stroke 41. In combination with FIG. 5, it is to be seen that the clamping pressure may be chosen to be constant over the cutting stroke (see the continuous line), but it may also be chosen to be increasing (see the broken line), for example. The knife 26 effectively contacts the light wave guide cable 22 to cut the inner sheath 24 as well as the core 23 by a smooth cut in a direction perpendicular to the longitudinal axis 51 (FIG. 9) during the cutting stroke. A compressing effect and a smoothening effect, respectively, as indicated by arrows 52 occurs corresponding to have the thickness of the knife back 27 and the cutting element 28, respectively. The compressing effect and the smoothening effect may be varied by a non-symmetric arrangement of the cutting edge portions 28 and 29 being located at the knife 26. For example, it may be decreased, as this is illustrated in FIG. 10. In the case of only one single cutting edge portion, the smoothening effect may either be chosen to reach its maximum or its minimum. In all these cases, contact between the knife 26 and the cut surface 45 of the cable 22 only takes place during the stroke of movement 39, meaning the forward stroke. At the end of the stroke of movement 39—meaning during the opening stroke 42—the work piece 46 and the piece of waste 47 of the cable 22 are released by opening the clamping jaws 17 and 19. The work piece 46 is removed from the pliers 1 before the backward stroke into the opening position of the pliers 1 starts.

FIG. 3 illustrates an intermediate position of the elements of the pliers head 2 during the cutting stroke. The cam drive 48 has pivoted the pivotal clamping jaw 19 in a counterclockwise direction, and the clamping profile 21 has been closed such that the light wave guide cable 22 is fixedly supported and contacted at the inner sheath 24. As it is to be seen from FIG. 9, the inner sheath 24 is contacted by the clamping jaws 17 and 19 to the right and to the left of the knife 26, meaning at both sides in a clamped way. In this relative position, the clamping jaws 17 and 19 move towards the blade 26, and they move therethrough.

Figure 4:
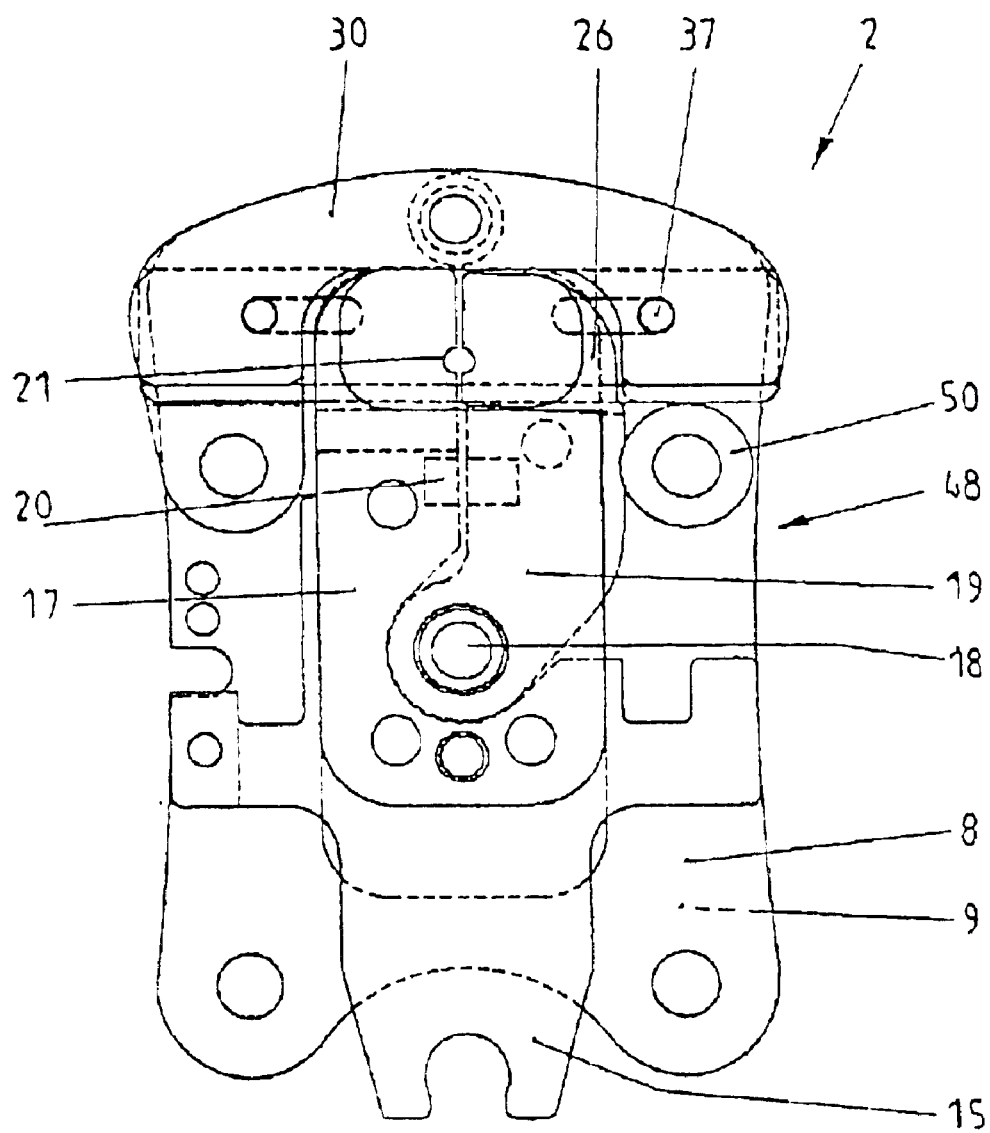
FIG. 4 is a top view of the pliers head of the novel pliers in an intermediate position during the opening stroke of the stroke of movement.

FIG. 4 illustrates an intermediate position of the elements of the pliers head 2 during the last portion of the stroke of movement 39—meaning during the opening stroke 42. Due to an impression being located in the cam surface 49, the pivotal clamping jaw 19 pivots in a clockwise sense of rotation due to the force of the spring being located in the spring housing 20, and the clamping profile 21 is opened such that the work piece 46 is released over the clamping stroke 43 (FIG. 5). The work piece 46 is then removed from the pliers head 2. In the following, the end position of the stroke of movement 39 is reached in which the, locking unit 11 allows for the backward stroke.

For attaining improved cutting quality, it is preferred to change the blade after each cutting step, or after a low number of cutting steps. For this purpose, the bolt 33 is pulled out, and the two supporting plates 30 and 31 together with the blade 26 located therebetween are pivoted away from the interior between the cover plates 8 and 9 (FIG. 6). The front supporting plate 30 is removed from the cylindrical pins 36 and 37. Then, the blade 26 is removed, and it is replaced by a new blade 26. In the following, the supporting plate 30 is reinserted, the unit is pivoted back in an inward direction, and it is secured by the pin 33.

FIG. 6 also illustrates the clamping jaws 17 and 19 as at least in the region of the clamping profile 21 having a substantial transverse extension with respect to the plane of main extension of the blade 26. The clamping jaws 17 and 19 each are designed to be one piece and continuous. They only include a guiding channel 53 in the region of the knife 26. The guiding channel 53 is chosen to be comparatively narrow, and it is coordinated with the thickness of the knife back 27 such that the relative movement occurring between the clamping jaws 17 and 19 and the blade 26 may take place over the stroke of movement 39 in a guided way.

FIG. 5 illustrates the stroke of movement 39 and the association of the clamping stroke 43 to the stroke of movement 39, respectively, as well as its portions of a clamping stroke 40, a cutting stroke 41 and an opening stroke 42. The continuous line illustrates a clamping stroke not varying during the cutting stroke, meaning a clamping stroke occurring at approximately constant clamping pressure. The broken line illustrates an increasing clamping pressure occurring in the clamping profile 21 during the cutting stroke 41.

Figure 7:
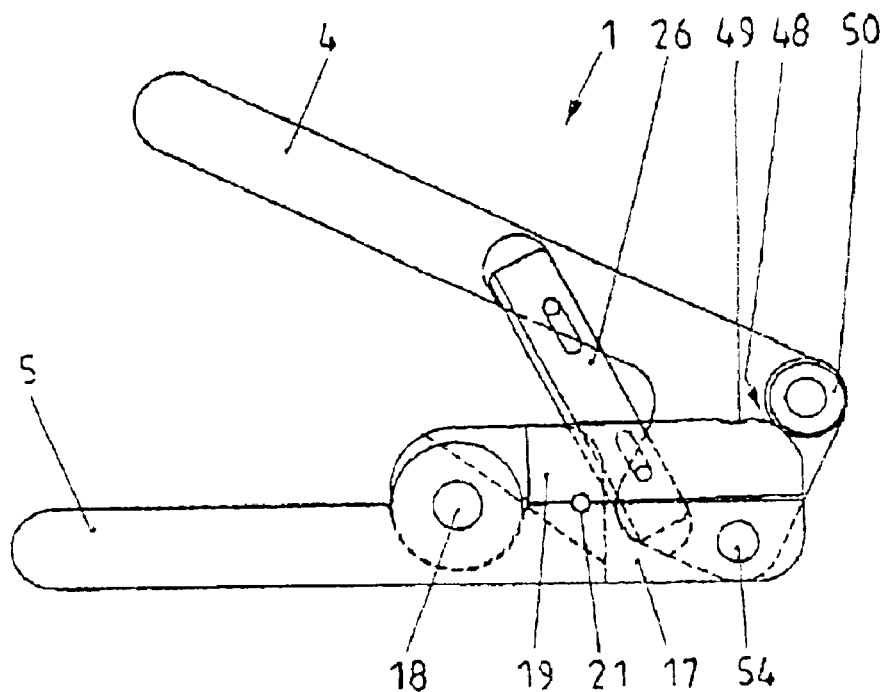
FIG. 7 is a side view of a second exemplary embodiment of the novel pliers in their opened position.
Figure 8:
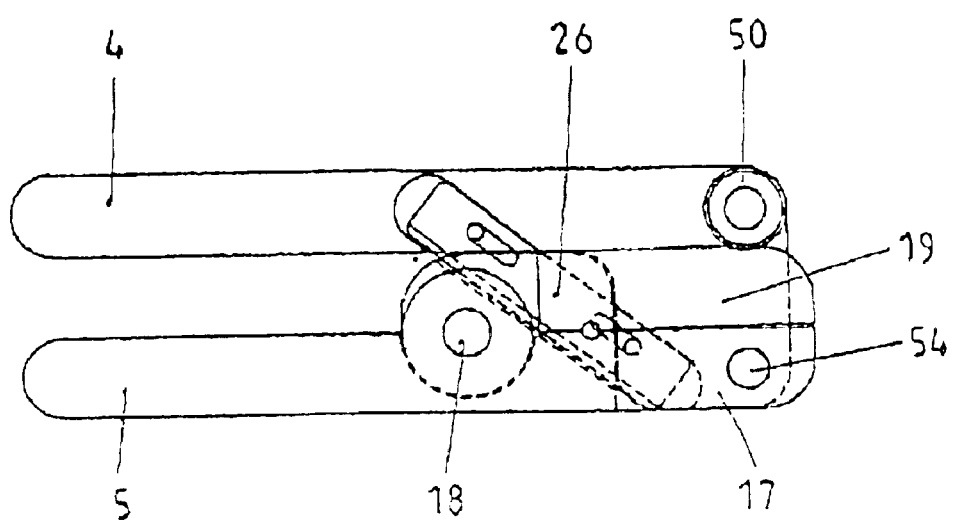
FIG. 8 is a view of the novel pliers according to FIG. 7 in the closed position.

FIGS. 7 and 8 illustrate a second exemplary embodiment of the novel pliers 1. The novel pliers 1 includes two handles 4, 5 being pivotally interconnected by a common supporting bolt 54. The handle 4 may be designated as a fixed handle. The blade 26 is supported at the handle 4 to be stationary. The handle 5 with one portion is designed as a fixed clamping jaw 17. The pivotal clamping jaw 19 is pivotally supported at the handle 5 and at the clamping jaw 17, respectively, to be pivotal about a pivot bearing 18. The clamping jaws 17 and 19 form a clamping profile 21 for inserting and clamping the inner sheath 24 of the light wave guide cable 22. The pliers 1 include a cam drive 48 being formed by a cam surface 49 being located at the clamping jaw 19 and by a pressure roller 50 being supported on the handle 4. The stroke of movement 39 takes place during the closing movement of the handles 4 and 5 such that the position according to FIG. 8 is reached. It may be seen from the combination of FIGS. 7 and 8 that the stroke of movement 39 includes the clamping stroke 40, the cutting stroke 41 and the opening stroke 42.

Many variations and modifications may be made to the preferred embodiments of the invention without departing substantially from the spirit and principles of the invention. All such modifications and variations are intended to be included herein within the scope of the present invention, as defined by the following claims.

We claim:

1. Pliers for cutting amorphous light wave guide cables including a core and at least one insulating sheath, comprising:
    a pliers head;
    a first clamping jaw and a second clamping jaw being arranged in said pliers head, said first and second clamping jaw being designed and arranged to form a clamping profile to receive a light wave guide cable;
    a cutting element being arranged in said pliers head to be stationary; and
    a drive being operatively connected to said first and second clamping jaw to move said first and second clamping jaw in one direction with respect to said cutting element during a stroke of movement, the stroke of movement including a clamping stroke, a cutting stroke and an opening stroke.

2. The pliers of claim 1, wherein the clamping stroke is variable, and wherein the clamping stroke is directed to be approximately perpendicular with respect to the stroke of movement.

3. The pliers of claim 1, wherein said cutting element at both sides includes cutting edge portions.

4. The pliers of claim 2, wherein said cutting element at both sides includes cutting edge portions.

5. The pliers of claim 1, wherein said cutting element is arranged in said pliers head to be easily removable.

6. The pliers of claim 1, wherein said first and second clamping jaw are arranged to form a first pair of clamping jaws.

7. The pliers of claim 6, further comprising a second pair of clamping jaws including a first clamping jaw and a second clamping jaw, said first pair of clamping jaws being arranged close to a first side of said cutting element and said second pair of clamping jaws being arranged close to a second side of said cutting element.

8. The pliers of claim 7, wherein said two first clamping jaws are designed as one piece, and wherein said two second clamping jaws are designed as one piece.

9. The pliers of claim 8, wherein said cutting element has a thickness, and wherein said first and second pair of clamping jaws each includes a guiding channel being coordinated with the thickness of said cutting element.

* * * * *